United States Patent
Kalyuzhny

(10) Patent No.: US 10,546,218 B2
(45) Date of Patent: Jan. 28, 2020

(54) METHOD FOR IMPROVING QUALITY OF RECOGNITION OF A SINGLE FRAME

(71) Applicant: ABBYY Development LLC, Moscow (RU)

(72) Inventor: Aleksey Kalyuzhny, Moscow region (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 15/719,385

(22) Filed: Sep. 28, 2017

(65) Prior Publication Data
US 2019/0073571 A1    Mar. 7, 2019

(30) Foreign Application Priority Data
Sep. 1, 2017    (RU) .................................. 2017130928

(51) Int. Cl.
*G06K 9/00*    (2006.01)
*G06K 9/72*    (2006.01)
*G06K 9/18*    (2006.01)
*G06F 17/28*    (2006.01)

(52) U.S. Cl.
CPC ......... *G06K 9/726* (2013.01); *G06F 17/2854* (2013.01); *G06K 9/00456* (2013.01); *G06K 9/18* (2013.01); *G06K 2209/01* (2013.01)

(58) Field of Classification Search
CPC ...... G06K 9/726; G06K 9/18; G06K 9/00456; G06K 2209/01; G06F 17/2854
See application file for complete search history.

(56) References Cited

U.S. PATENT DOCUMENTS

| | | | |
|---|---|---|---|
| 7,620,268 B2 | 11/2009 | Myers et al. | |
| 7,840,033 B2 | 11/2010 | Kurzweil et al. | |
| 9,058,536 B1 | 6/2015 | Yuan et al. | |
| 9,064,174 B2 | 6/2015 | Nister et al. | |
| 9,191,554 B1* | 11/2015 | Manohar | H04N 1/00198 |
| 9,984,287 B2* | 5/2018 | George | G06K 9/00469 |
| 2002/0051575 A1* | 5/2002 | Myers | G06K 9/3258 |
| | | | 382/202 |
| 2007/0177167 A1* | 8/2007 | Hatasawa | G06T 3/4053 |
| | | | 358/1.2 |
| 2007/0214486 A1* | 9/2007 | Woo | G06K 9/325 |
| | | | 725/106 |
| 2011/0222768 A1* | 9/2011 | Galic | G06K 9/38 |
| | | | 382/170 |

(Continued)

FOREIGN PATENT DOCUMENTS

| | | |
|---|---|---|
| EP | 2801053 A1 | 11/2014 |
| WO | 2014107246 A1 | 7/2014 |
| WO | 2015165524 A1 | 11/2015 |

*Primary Examiner* — Amara Abdi
(74) *Attorney, Agent, or Firm* — Lowenstein Sandler LLP

(57) ABSTRACT

Systems and methods for performing OCR of an image depicting text symbols. An example method comprises: receiving an original image of a document; identifying location of a symbol sequence in the image; performing a series of conversion operations on a the portion of the image containing the identified symbol sequence; performing OCR of the symbol sequence in the resulting images; and combining these OCR results to produce a resulting OCR text representing at least a portion of the original document.

17 Claims, 5 Drawing Sheets

(56) References Cited

U.S. PATENT DOCUMENTS

| | | | | |
|---|---|---|---|---|
| 2011/0246173 A1* | 10/2011 | Li | ............... | G06F 17/2827 704/2 |
| 2013/0243263 A1* | 9/2013 | Ishihara | ............. | G06K 9/00442 382/112 |
| 2014/0253701 A1* | 9/2014 | Wexler | ............... | A61F 9/08 348/62 |
| 2015/0169951 A1 | 6/2015 | Khintsitskiy et al. | | |

* cited by examiner

METHOD FOR IMPROVING QUALITY OF RECOGNITION OF A SINGLE FRAME

CROSS-REFERENCE TO RELATED APPLICATIONS

This application claims the benefit of priority to Russian Application No. 2017130928, filed Sep. 1, 2017, the disclosure of which is incorporated herein by reference in its entirety.

TECHNICAL FIELD

The present disclosure is generally related to computer systems, and is more specifically related to systems and methods for optical character recognition (OCR).

BACKGROUND

Optical character recognition (OCR) is a computer-implemented conversion of text images (including typed, handwritten, or printed text) into computer-encoded electronic documents.

SUMMARY OF THE DISCLOSURE

In accordance with one or more aspects of the present disclosure, an example method for performing optical character recognition (OCR) of an image depicting symbols may comprise receiving, by a processing device, an original image of a document; identifying location of a first symbol sequence in the original image; applying a first set of conversion operations to a first portion of the original image comprising the location of the first symbol sequence to generate a first converted portion of the original image; performing optical character recognition (OCR) of the first converted portion of the original image to produce a first recognized first symbol sequence; applying a second set of conversion operations to the first portion of the original image comprising the location of the first symbol sequence to generate a second converted portion of the original image; performing optical character recognition (OCR) of the second converted portion of the original image to produce a second recognized first symbol sequence; and combining the first recognized first symbol sequence and the second recognized first symbol sequence to produce a resulting first symbol sequence; applying a third set of conversion operations to the first portion of the original image comprising the location of the first symbol sequence to generate a third converted portion of the original image; performing optical character recognition (OCR) of the third converted portion of the original image to produce a third recognized first symbol sequence; and combining the first recognized first symbol sequence, the second recognized first symbol sequence, and the third recognized first symbol sequence to produce the resulting first symbol sequence; and translating the resulting first line text into a second natural language; wherein the conversion operations are selected from a group of conversion operations comprising changing one or more of the following image settings: resolution, binarization method, correction of distortion settings, glare correction settings, fuzziness correction settings, and noise reduction. In some implementations the method comprises steps of applying next set of conversion operations to the first portion of the original image comprising the location of the first symbol sequence to generate another converted portion of the original image; performing optical character recognition (OCR) of the other converted portion of the original image to produce another recognized first symbol sequence; predetermined number of times. In some implementations the method comprises steps of detecting quality of the resulting first line of text; comparing the detected quality of the resulting first line of text to a predetermined quality threshold; in response to determination that the detected quality of the resulting first line of text does not comply with the predetermined quality threshold, applying next set of conversion operations to the first symbol sequence to generate another converted portion of the original image; performing optical character recognition (OCR) of the other converted first symbol sequence to produce another recognized first symbol sequence; combining the other recognized first symbol sequence with previous recognized first symbol sequence to produce an updated resulting first symbol sequence. In some implementations the combining of the first recognized first symbol sequence and the second recognized first symbol sequence comprises identifying a median string representing the first symbol sequence or a weighted median string representing the first symbol sequence. In some implementations the identifying a median string representing the first line of text comprises identifying edit distance between the first recognized first line of text and the second recognized first line of text or identifying Levenshtein distance between the first recognized first line of text and the second recognized first line of text.

In accordance with one or more aspects of the present disclosure, an example system for performing optical character recognition (OCR) of a series of images depicting symbols of a certain alphabet may comprise: a memory; a processing device, coupled to the memory, the processing device configured to: receive, by a processing device, an original image of a document; identify location of a first symbol sequence in the original image; apply a first set of conversion operations to a first portion of the original image comprising the location of the first symbol sequence to generate a first converted portion of the original image; perform optical character recognition (OCR) of the first converted portion of the original image to produce a first recognized first symbol sequence; apply a second set of conversion operations to the first portion of the original image comprising the location of the first symbol sequence to generate a second converted portion of the original image; perform optical character recognition (OCR) of the second converted portion of the original image to produce a second recognized first symbol sequence; and combine the first recognized first symbol sequence and the second recognized first symbol sequence to produce a resulting first symbol sequence; apply a third set of conversion operations to the first portion of the original image comprising the location of the first symbol sequence to generate a third converted portion of the original image; perform optical character recognition (OCR) of the third converted portion of the original image to produce a third recognized first symbol sequence; and combine the first recognized first symbol sequence, the second recognized first symbol sequence, and the third recognized first symbol sequence to produce the resulting first symbol sequence; and translate the resulting first line text into a second natural language; wherein the conversion operations are selected from a group of conversion operations comprising changing one or more of the following image settings: resolution, binarization method, correction of distortion settings, glare correction settings, fuzziness correction settings, and noise reduction. In some implementations the system is configured to also apply next set of conversion operations to the first portion of the original image comprising the location of the first symbol sequence to generate another converted portion of the original image; perform optical character recognition (OCR) of the other converted portion of the original image to produce another recognized first symbol sequence; predetermined number of times. In some implementations the system is configured to also detect quality of the resulting first line of text; compare the detected quality of the resulting first line of text to a predetermined quality threshold; in response to determination that the detected quality of the resulting first line of text does not comply with the predetermined quality threshold, apply next set of conversion operations to the first symbol sequence to generate another converted portion of the original image; perform optical character recognition (OCR) of the other converted first symbol sequence to produce another recognized first symbol sequence; combine the other recognized first symbol sequence with previous recognized first symbol sequence to produce an updated resulting first symbol sequence. In some implementations the combining of the first recognized first symbol sequence and the second recognized first symbol sequence comprises identifying a median string representing the first symbol sequence or a weighted median string representing the first symbol sequence. In some implementations the identifying a median string representing the first line of text comprises identifying edit distance between the first recognized first line of text and the second recognized first line of text or identifying Levenshtein distance between the first recognized first line of text and the second recognized first line of text.

In accordance with one or more aspects of the present disclosure, an example computer-readable non-transitory storage medium may comprise executable instructions that, when executed by a processing device, cause the processing device to: receive, by a processing device, an original image of a document; identify location of a first symbol sequence in the original image; apply a first set of conversion operations to a first portion of the original image comprising the location of the first symbol sequence to generate a first converted portion of the original image; perform optical character recognition (OCR) of the first converted portion of the original image to produce a first recognized first symbol sequence; apply a second set of conversion operations to the first portion of the original image comprising the location of the first symbol sequence to generate a second converted portion of the original image; perform optical character recognition (OCR) of the second converted portion of the original image to produce a second recognized first symbol sequence; and combine the first recognized first symbol sequence and the second recognized first symbol sequence to produce a resulting first symbol sequence; apply a third set of conversion operations to the first portion of the original image comprising the location of the first symbol sequence to generate a third converted portion of the original image; perform optical character recognition (OCR) of the third converted portion of the original image to produce a third recognized first symbol sequence; and combine the first recognized first symbol sequence, the second recognized first symbol sequence, and the third recognized first symbol sequence to produce the resulting first symbol sequence; and translate the resulting first line text into a second natural language; wherein the conversion operations are selected from a group of conversion operations comprising changing one or more of the following image settings: resolution, binarization method, correction of distortion settings, glare correction settings, fuzziness correction settings, and noise reduction. In some implementations the system is configured to also apply next set of conversion operations to the first portion of the original image comprising the location of the first symbol sequence to generate another converted portion of the original image; perform optical character recognition (OCR) of the other converted portion of the original image to produce another recognized first symbol sequence; predetermined number of times. In some implementations the system is configured to also detect quality of the resulting first line of text; compare the detected quality of the resulting first line of text to a predetermined quality threshold; in response to determination that the detected quality of the resulting first line of text does not comply with the predetermined quality threshold, apply next set of conversion operations to the first symbol sequence to generate another converted portion of the original image; perform optical character recognition (OCR) of the other converted first symbol sequence to produce another recognized first symbol sequence; combine the other recognized first symbol sequence with previous recognized first symbol sequence to produce an updated resulting first symbol sequence. In some implementations the combining of the first recognized first symbol sequence and the second recognized first symbol sequence comprises identifying a median string representing the first symbol sequence or a weighted median string representing the first symbol sequence. In some implementations the identifying a median string representing the first line of text comprises identifying edit distance between the first recognized first line of text and the second recognized first line of text or identifying Levenshtein distance between the first recognized first line of text and the second recognized first line of text.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
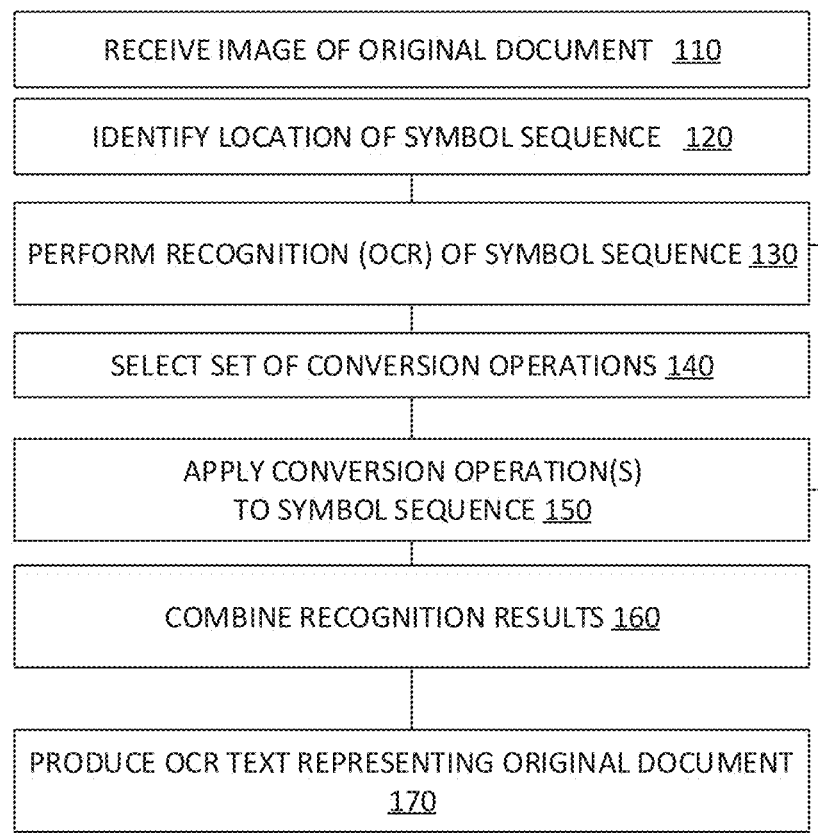
FIG. 1 depicts a flow diagram of one illustrative example of a method for performing optical character recognition (OCR) of an image comprising text symbols, in accordance with one or more aspects of the present disclosure.

Described herein are methods and systems for performing optical character recognition (OCR) of one or more images depicting symbols of a certain alphabet. The alphabets whose symbols may be processed by the systems and methods described herein include true alphabets that have separate symbols, or glyphs, representing individual sounds, as well as hieroglyphic alphabets that have separate symbols representing larger units such as syllables or words.

In the following description, the term "document" shall be interpreted broadly as referring to a wide variety of text carrying media, including but not limited to printed or handwritten paper documents, banners, posters, signs, billboards, and/or other physical objects carrying visible text symbols on one or more of their surfaces. "Document image" herein shall refer to an image of at least a part of the original document (e.g., a page of a paper document).

An OCR system may acquire a document image and transform the acquired image into a computer-readable and searchable format comprising the textual information extracted from the image of the document. The OCR process may be hindered by various image defects, such as visual noise, poor focus or image clarity, glares, etc., which may be routinely caused by the camera shake, inadequate illumination, incorrectly chosen shutter speed or aperture, and/or other conditions and attenuating circumstances. While common OCR methods may not always correctly perform character recognition in the presence of the above-noted and other image defects, the systems and methods described herein may significantly improve the OCR quality by creating a set of images by applying different sets of conversion operations to the image of the document, as described in more details herein below.

In certain implementations, the text produced by the OCR systems and methods described herein may be further processed, e.g., by machine translation methods for translating the original text into another natural language.

In an illustrative example, a computer system implementing the methods described herein may receive an image of the original document.

The computer system may detect a portion of the image that includes a symbol sequence which may form a word, a group of words, or a line of text. The system may apply one or more sets of conversion operations to this portion of the image (or to the whole image), creating a series of converted portions of the image. Each set of conversion operations may consist of one or more conversion operations. Conversion operations may include: changing resolution the portion of the image, applying a different binarization method, changing distortion settings, glare-compensation settings, blur-control settings, changing noise reduction operations. These operations may be applied to the portion of the image individually or in groups, sequentially or in parallel.

Then the system may perform character recognition on these multiple versions of the portion of the image (or the whole image), producing a series of recognized symbol sequences. The system combines the recognized symbol sequences to improve quality of recognition.

Figure 3:
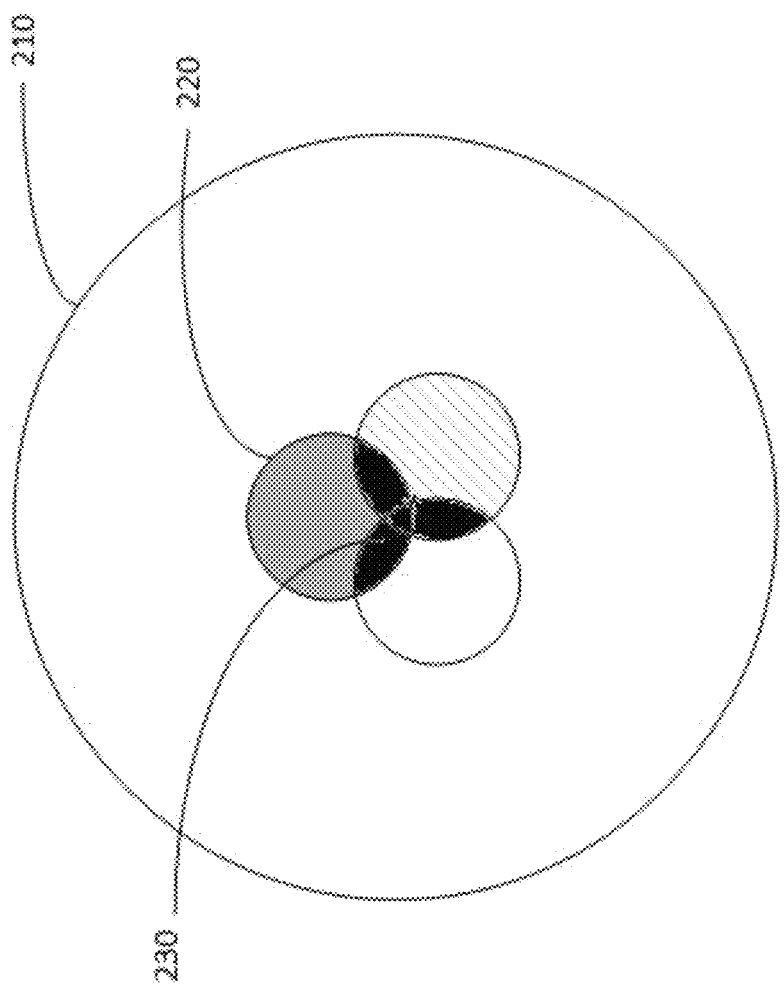
FIG. 3 schematically illustrates a concept of reducing number of recognition errors by using a series of images resulting from different conversion operations.

It is well known, that different image defects create different types of recognition mistakes. FIG. 3 illustrates this as follows. Circle 210 represents all possible recognition mistakes. Circle 220 and similar circles represent recognition mistakes that remain in the document after a particular conversion operation is applied to the image. Area 230 represents a number of recognition mistakes that may persist in the document if the results of OCR obtained using different sets of conversion operations are combined.

For combining the recognized symbol sequences a median string method can be used. In this method for each cluster of matching symbol sequences, the median string representing the OCR result of the associated image fragment may be identified. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

Various aspects of the above referenced methods and systems are described in details herein below by way of examples, rather than by way of limitation.

FIG. 1 depicts a flow diagram of one illustrative example of a method 100 for performing OCR of an image comprising text symbols, in accordance with one or more aspects of the present disclosure. Method 100 and/or each of its individual functions, routines, subroutines, or operations may be performed by one or more processors of the computer system (e.g., example computer system 500 of FIG. 5) executing the method. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

For clarity and conciseness, the present description assumes that conversions of the image of an original document are performed sequentially, the next conversion is initiated after the previous conversion of the image is substantially completed. However, in various alternative implementations, conversions of the image may overlap in time (e.g., may be performed by different threads or processes that are running on one or more processors). Alternatively, two or more conversions may be buffered and processed asynchronously with respect to performing other conversions by the computer system implementing the method.

The present disclosure references "an image" (e.g., a video frame or a still image) of the original document. The image may be referred to as "original image", i.e. an image before the system applies conversion operations. After the operations are applied to the whole original image or a portion of the original image, the image/portion of the image can be referred to as "converted image"/"converted portion of the image".

Figure 2:
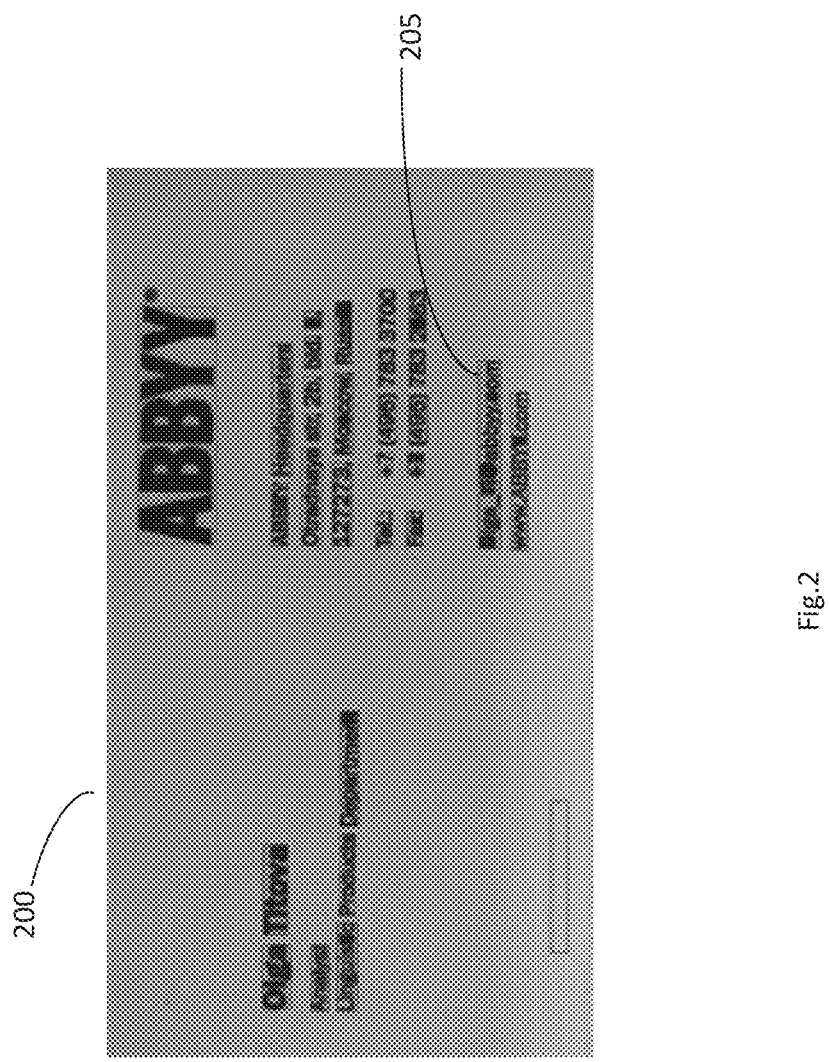
FIG. 2 schematically illustrates an image with identified symbol sequences.

At block 110, the computer system implementing the method may receive the original image. At block 120, the computer system may identify location of a symbol sequence in the image. As illustrated in FIG. 2, the system may identify the locations of symbol sequences by segmentation, i.e. by identifying within the image 200*a* number of rectangles, such as rectangle 205, containing symbol sequences. Such symbol sequences may contain letters, numbers, special symbols, punctuation symbols, etc. Any known method of identifying locations of symbol sequences in an image can be used in this method.

At block 130 the system performs recognition (OCR) of the symbol sequence, which location was identified by the system in block 120. The recognition may be performed using any known method, such as matrix matching, feature extraction, or combination thereof.

At block 140 the system selects a set of conversion operations to be applied to a portion of the original image which contains the symbol sequence. In some implementations the set of conversion operation is applied to the whole original image of the document.

A conversion operation is a transformation operation performed over an image that changes the image in some respect. For example, conversion operations include changing resolution of the image, performing binarization of the image using certain parameters, correction of distortions, glare, or fuzziness, performing noise reduction operations, etc.

The step 140 of selecting a set of conversion operation may include selecting operations from a list of types of available operations and/or selecting parameters for one or more of the selected operations. The set of conversion operations may consist of one or more conversion operations. In some implementations the sequence of sets of conversion operations/parameters of the operations is pre-defined. In other implementations the selection of the sets of conversion operations and/or their parameters is performed based on system feedback. In some implementations the same conversion operation with different parameters may be included into the set of conversion operations.

At block 150 the system applies the selected conversion operation to the image (or a portion of the image, containing the symbol sequence) producing a converted image, corresponding to the selected set of conversion operations.

After the conversion 150 of the image is performed, the system repeats the steps 130 of performing recognition of the symbol sequence using the converted image. This recognition produces another symbol sequence, that may be different from symbol sequences recognized using the original image.

In some implementations the system performs the steps 130-150 multiple times to create a series of converted images and a corresponding series of recognized symbol sequences. In some implementations the number of times the conversion/recognition is performed is predetermined. In other implementations the number is determined based on system feedback.

At block 160, the computer system may combine recognition results for the series of modified image. The system may perform combining by identifying the median string of each cluster of matching symbol sequences, such that the identified median string would represent the OCR result of the associated image fragment.

Figure 4A:
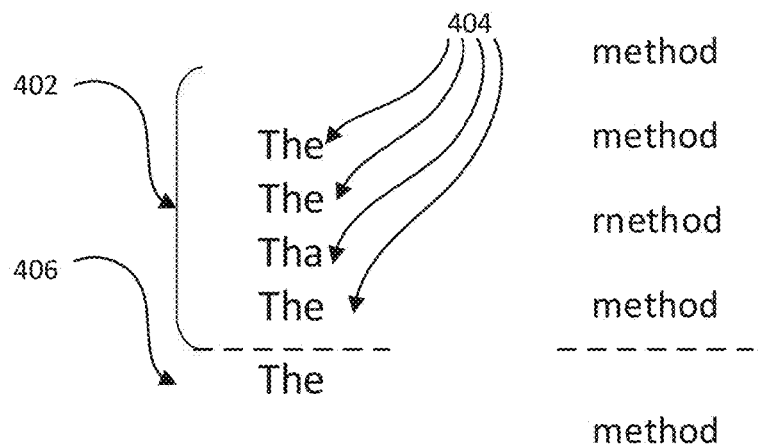
FIGS. 4A-4C schematically illustrate identifying the median string among a plurality of symbol sequences representing the OCR results of the corresponding image fragments, in accordance with one or more aspects of the present disclosure.

As schematically illustrated by FIG. 4A, each cluster 402 may comprise a plurality of matching symbol sequences 404, and the OCR result of the associated image fragment may be represented by the median string 406. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

Figure 4B:
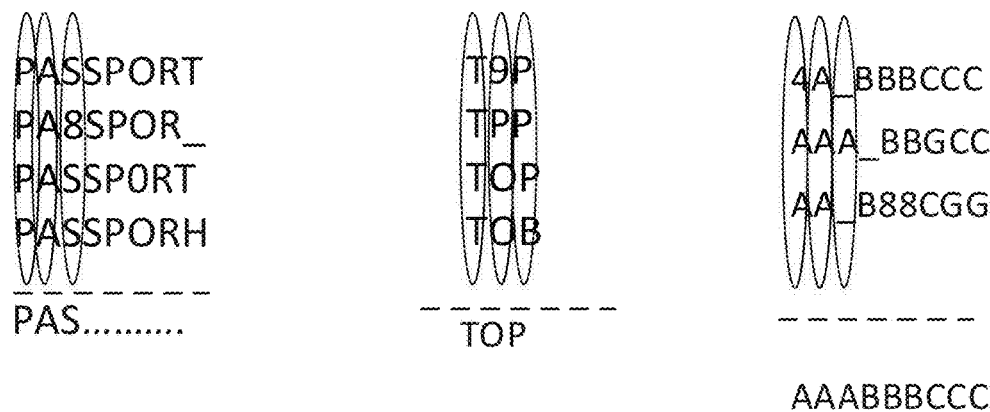
Figure 4C:
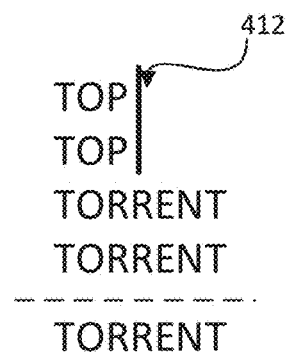

In certain implementations, the computational complexity of identifying the median string may be reduced by applying certain heuristics methods. In an illustrative example, the computer system may heuristically identify the zeroth-order approximation of the median string. The computer system may then align the symbol sequences using strictly matching symbols within each sequence, as schematically illustrated by FIG. 4B. In another illustrative example, the computer system may calculate weighted median by associating with each symbol sequence of the cluster, a weight coefficient reflecting the position of the symbol sequence within the image or the OCR confidence metric. As schematically illustrated by FIG. 4C, a cluster 412 comprises four symbol sequences TOP, TOP, TORRENT, TORRENT. The first two symbol sequences represent partial words, since the distance from an edge of the minimum bounding rectangle of the symbol sequence to the edge of the image is less than the whitespace width. Therefore the OCR confidence metric value for the first two symbol sequences is significantly less than the OCR confidence metric value for the remaining two symbol sequences, and hence the symbol sequence TORRENT would be chosen as the median string by the method that takes into account the OCR confidence values.

In various implementations, the operations described by blocks 130-150 ??? may be performed in the different sequence or in parallel. Alternatively, certain implementations may omit certain operations described by blocks 110-120.

Referring again to FIG. 1, at block 170, the computer system may utilize the resulting symbol sequences in order to produce the resulting text representing the original document.

As noted herein above, the text produced by the OCR systems and methods described herein may be further processed, e.g., by machine translation methods for translating the original text into another natural language. Since the methods described herein allow reconstructing the original text, and not only individual words, the machine translation methods may employ syntactic and/or semantic analyses of the original text in order to improve the translation quality.

Figure 5:
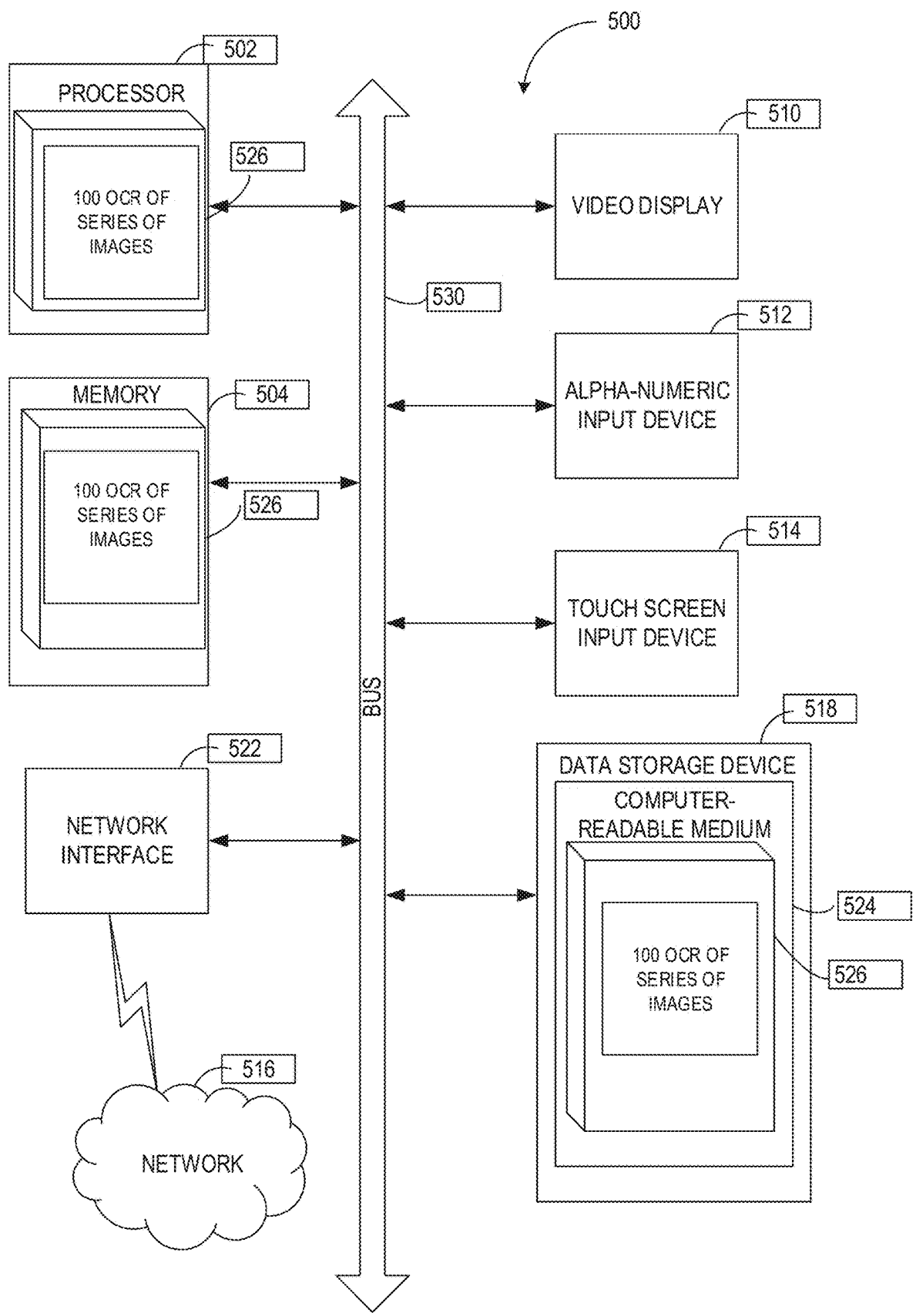
FIG. 5 depicts a diagram of an illustrative example of a computer system implementing the methods described herein

FIG. 5 depicts a component diagram of an example computer system 500 within which a set of instructions, for causing the computer system to perform any one or more of the methods discussed herein, may be executed. The computer system 500 may be connected to other computer system in a LAN, an intranet, an extranet, or the Internet. The computer system 500 may operate in the capacity of a server or a client computer system in client-server network environment, or as a peer computer system in a peer-to-peer (or distributed) network environment. The computer system 500 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 500 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and functions of method 100 for performing OCR of a series of images comprising text symbols, as described herein above.

Computer system 500 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methods or functions described herein. Instructions 526 may also reside, completely or at least partially, within main memory 504 and/or within processor 502 during execution thereof by computer system 500, main memory 504 and processor 502 also constituting computer-readable storage media. Instructions 526 may further be transmitted or received over network 516 via network interface device 522.

In certain implementations, instructions 526 may include instructions of method 100 for performing OCR of a series of images comprising text symbols, as described herein above. While computer-readable storage medium 524 is shown in the example of FIG. 5 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a processing device, an original image of a document;
   identifying location of a first symbol sequence in the original image;
   applying a first set of conversion operations to a first portion of the original image comprising the location of the first symbol sequence to generate a first converted portion of the original image, wherein the first set of conversion operations comprises a first conversion operation that changes a first image setting, and wherein the first image setting comprises at least one of a resolution setting, a binarization method, a correction of distortion settings, glare correction settings, fuzziness correction settings, or noise reduction;
   performing optical character recognition (OCR) of the first converted portion of the original image to produce a first recognized first symbol sequence;
   applying a second set of conversion operations to the first portion of the original image comprising the location of the first symbol sequence to generate a second converted portion of the original image, wherein the second set of conversion operations is different than the first set of conversion operations, wherein the second set of conversion operations comprises a second conversion operation that changes a second image setting, wherein the second image setting comprises at least one of the resolution setting, the binarization method, the correction of distortion settings, the glare correction settings, the fuzziness correction settings, or the noise reduction, and wherein the second image setting is different from the first image setting;

performing optical character recognition (OCR) of the second converted portion of the original image to produce a second recognized first symbol sequence; and combining the first recognized first symbol sequence and the second recognized first symbol sequence to produce a resulting first symbol sequence.

2. The method of claim 1 further comprising applying a third set of conversion operations to the first portion of the original image comprising the location of the first symbol sequence to generate a third converted portion of the original image;

performing optical character recognition (OCR) of the third converted portion of the original image to produce a third recognized first symbol sequence; and combining the first recognized first symbol sequence, the second recognized first symbol sequence, and the third recognized first symbol sequence to produce the resulting first symbol sequence.

3. The method of claim 2 wherein the set of conversion operations comprises a first conversion operation with a first set of conversion parameters the second conversion operation with a second set of conversion parameters.

4. The method of claim 2 further comprising performing the steps of applying next set of conversion operations to the first portion of the original image comprising the location of the first symbol sequence to generate another converted portion of the original image;

performing optical character recognition (OCR) of the other converted portion of the original image to produce another recognized first symbol sequence;

predetermined number of times.

5. The method of claim 2 further comprising detecting quality of the resulting first symbol sequence;

comparing the detected quality of the resulting first symbol sequence to a predetermined quality threshold;

in response to determination that the detected quality of the resulting first does not comply with the predetermined quality threshold, applying a next set of conversion operations to the first symbol sequence to generate another converted portion of the original image;

performing optical character recognition (OCR) of the other converted first symbol sequence to produce another recognized first symbol sequence;

combining the other recognized first symbol sequence with previous recognized first symbol sequence to produce an updated resulting first symbol sequence.

6. The method of claim 1 wherein the combining of the first recognized first symbol sequence and the second recognized first symbol sequence comprises identifying a median string representing the first symbol sequence.

7. The method of claim 6 wherein the identifying a median string representing the first symbol sequence comprises identifying edit distance between the first recognized first line of text symbol sequence and the second recognized first symbol sequence.

8. The method of claim 6 wherein the identifying a median string representing the first symbol sequence comprises identifying Levenshtein distance between the first recognized first symbol sequence and the second recognized first symbol sequence.

9. The method of claim 1, wherein the first symbol sequence is provided in a first natural language, the method further comprising:

translating the resulting first symbol sequence into a second natural language.

10. A system, comprising:

a memory;

a processing device, coupled to the memory, the processing device configured to:

receive, by a processing device, an original image of a document;

identify location of a first symbol sequence in the original image;

apply a first set of conversion operations to a first portion of the original image comprising the location of the first symbol sequence to generate a first converted portion of the original image, wherein the first set of conversion operations comprises a first conversion operation that changes a first image setting, and wherein the first image setting comprises at least one of a resolution setting, a binarization method, a correction of distortion settings, glare correction settings, fuzziness correction settings, or noise reduction;

perform optical character recognition (OCR) of the first converted portion of the original image to produce a first recognized first symbol sequence;

apply a second set of conversion operations to the first portion of the original image comprising the location of the first symbol sequence to generate a second converted portion of the original image, wherein the second set of conversion operations is different than the first set of conversion operations, wherein the second set of conversion operations comprises a second conversion operation that changes a second image setting, wherein the second image setting comprises at least one of the resolution setting, the binarization method, the correction of distortion settings, the glare correction settings, the fuzziness correction settings, or the noise reduction, and wherein the second image setting is different from the first image setting;

perform optical character recognition (OCR) of the second converted portion of the original image to produce a second recognized first symbol sequence; and combine the first recognized first symbol sequence and the second recognized first symbol sequence to produce a resulting first symbol sequence.

11. The system of claim 10 further configured to apply a third set of conversion operations to the first portion of the original image comprising the location of the first symbol sequence to generate a third converted portion of the original image;

perform optical character recognition (OCR) of the third converted portion of the original image to produce a third recognized first symbol sequence; and combine the first recognized first symbol sequence, the second recognized first symbol sequence, and the third recognized first symbol sequence to produce the resulting first symbol sequence.

12. The system of claim 11 wherein the set of conversion operations comprises a first conversion operation with a first set of conversion parameters the second conversion operation with a second set of conversion parameters.

13. The system of claim 11 further configured to
apply next set of conversion operations to the first portion of the original image comprising the location of the first symbol sequence to generate another converted portion of the original image;
perform optical character recognition (OCR) of the other converted portion of the original image to produce another recognized first symbol sequence;
predetermined number of times.

14. The system of claim 11 further configured to
detect quality of the resulting first symbol sequence;
compare the detected quality of the resulting first symbol sequence to a predetermined quality threshold;
in response to determination that the detected quality of the resulting first symbol sequence does not comply with the predetermined quality threshold, apply next set of conversion operations to the first symbol sequence to generate another converted portion of the original image;
perform optical character recognition (OCR) of the other converted first symbol sequence to produce another recognized first symbol sequence;
combine the other recognized first symbol sequence with previous recognized first symbol sequence to produce an updated resulting first symbol sequence.

15. The system of claim 10, wherein the first symbol sequence is provided in a first natural language, the system further configured to translate the resulting first symbol sequence into a second natural language.

16. A computer-readable non-transitory storage medium comprising executable instructions that, when executed by a processing device, cause the processing device to:
receive an original image of a document;
identify location of a first symbol sequence in the original image;
apply a first set of conversion operations to a first portion of the original image comprising the location of the first symbol sequence to generate a first converted portion of the original image, wherein the first set of conversion operations comprises a first conversion operation that changes a first image setting, and wherein the first image setting comprises at least one of a resolution setting, a binarization method, a correction of distortion settings, glare correction settings, fuzziness correction settings, or noise reduction;
perform optical character recognition (OCR) of the first converted portion of the original image to produce a first recognized first symbol sequence;
apply a second set of conversion operations to the first portion of the original image comprising the location of the first symbol sequence to generate a second converted portion of the original image, wherein the second set of conversion operations is different than the first set of conversion operations, wherein the second set of conversion operations comprises a second conversion operation that changes a second image setting, wherein the second image setting comprises at least one of the resolution setting, the binarization method, the correction of distortion settings, the glare correction settings, the fuzziness correction settings, or the noise reduction, and wherein the second image setting is different from the first image setting;
perform optical character recognition (OCR) of the second converted portion of the original image to produce a second recognized first symbol sequence; and
combine the first recognized first symbol sequence and the second recognized first symbol sequence to produce a resulting first symbol sequence.

17. The computer-readable non-transitory storage medium of claim 16 further comprising executable instructions that, when executed by a processing device, cause the processing device to
apply a third set of conversion operations to the first portion of the original image comprising the location of the first symbol sequence to generate a third converted portion of the original image;
perform optical character recognition (OCR) of the third converted portion of the original image to produce a third recognized first symbol sequence; and
combine the first recognized first symbol sequence, the second recognized first symbol sequence, and the third recognized first symbol sequence to produce the resulting first symbol sequence.

* * * * *